Patented July 4, 1933

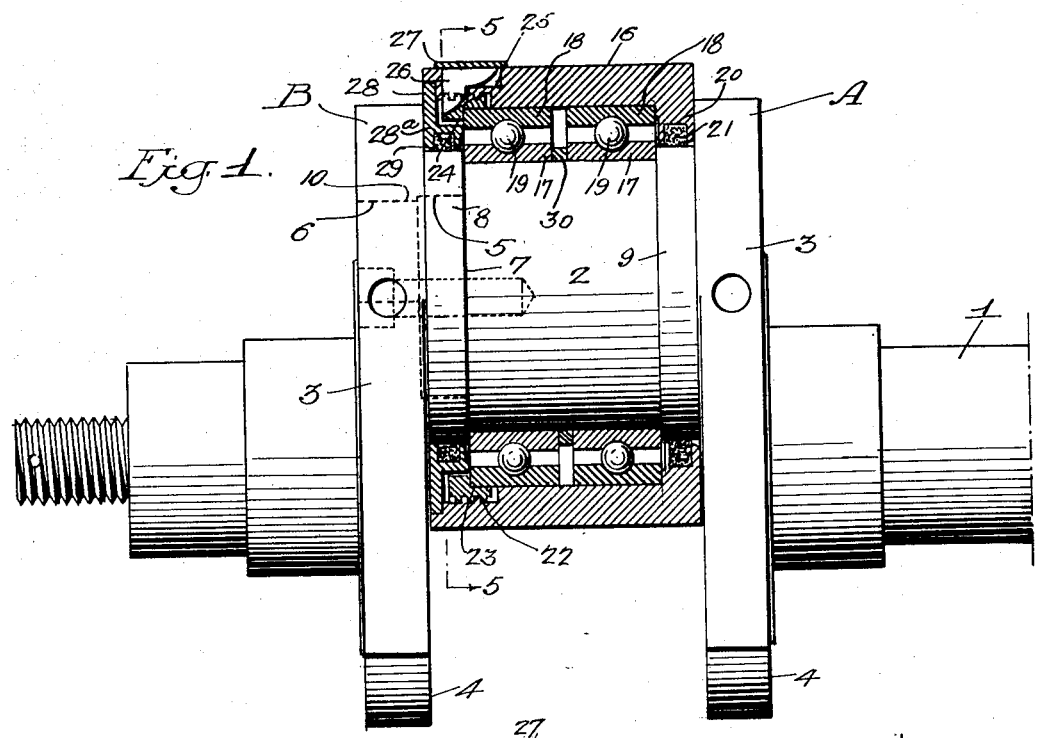

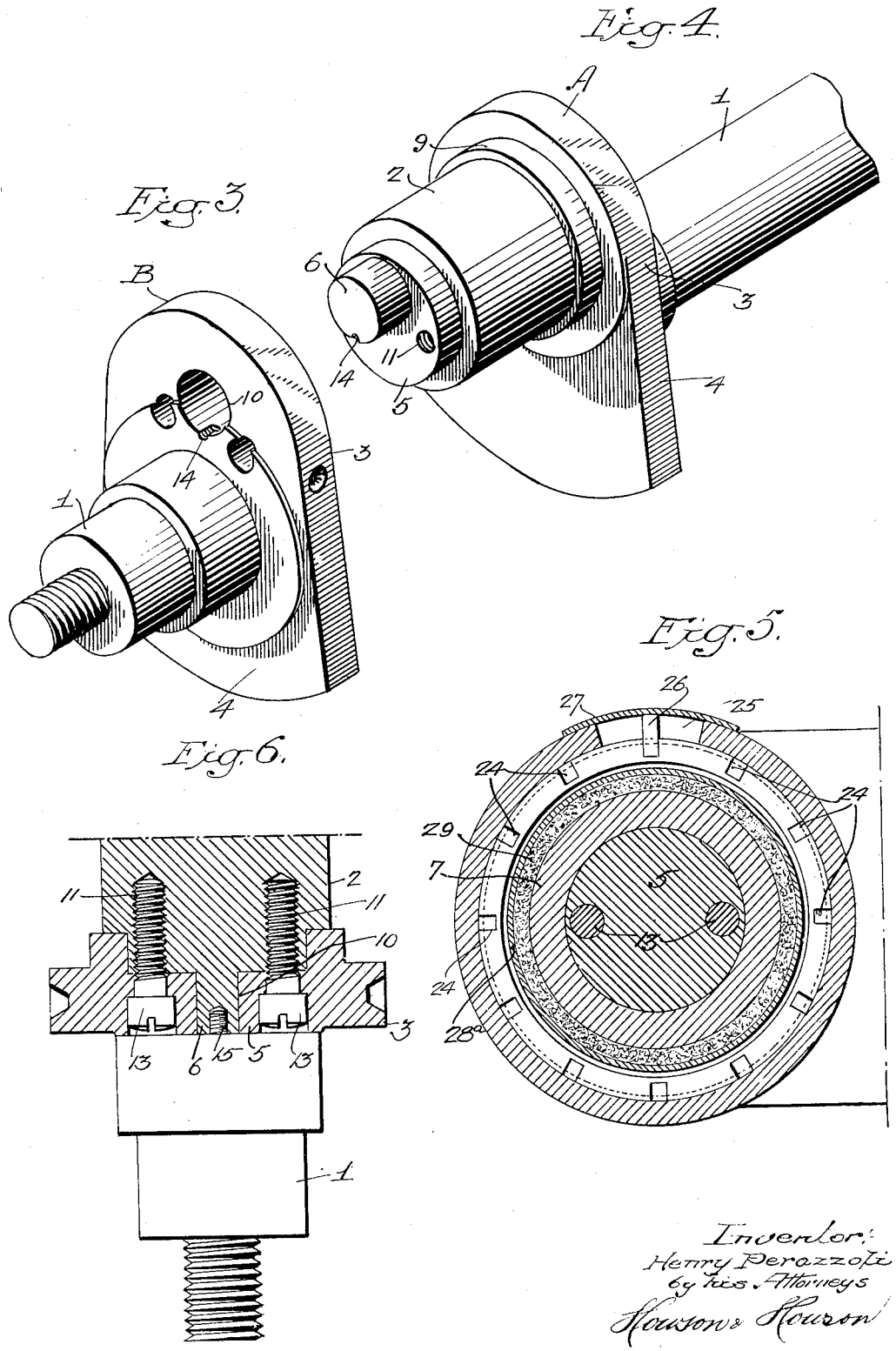

1,917,148

UNITED STATES PATENT OFFICE

HENRY PERAZZOLI, OF PHILADELPHIA, PENNSYLVANIA

CRANK SHAFT

Application filed December 10, 1932. Serial No. 646,651.

This invention relates generally to new and useful improvements in ball bearing connections and has more particular reference to a novel and efficient ball bearing assembly primarily designed for securing a connecting rod to the crank pin of a crank shaft.

An important object of the present invention is to improve generally the manner of securing the connecting rod to the crank shaft in a manner reducing to a minimum the amount of friction between said shaft and the rod.

Another important object of the invention is to provide a connecting rod and crank shaft mechanism which may be quickly and easily adjusted to take up play in the relatively moving parts thereof.

A more specific object of the invention is to provide a connecting rod having a hub arranged to embrace the crank pin of a crank shaft, the said hub being of continuous annular configuration and a continuous ball bearing ring structure therein whereby the customary split hub and bearing elements may be eliminated.

A further object of the invention is to provide a crank shaft comprising the customary crank pin offset therefrom, the said crank shaft being separable at the juncture of the crank pin and its supporting arm to permit mounting of the annular hub structure of the connecting rod thereon.

A further object of the invention is to provide a connecting rod and crank shaft structure which embodies relatively few parts and is of extremely simple, yet rugged construction and capable of withstanding substantially heavy thrust loads at relatively high speed.

These and other objects and details of construction of the invention are set forth hereinafter and disclosed in the accompanying drawings, in which:

Figure 1 is a view in elevation of the crank shaft and crank pin showing in section, the connecting rod hub and bearing assembly associated therewith;

Fig. 2 is an end view of the disclosure in Fig. 1;

Figs. 3 and 4 respectively, are views in perspective showing the novel construction of the sectional crank shaft;

Fig. 5 is a view in section on line 5—5, Fig. 1; and

Fig. 6 is a view in section on line 6—6, Fig. 2.

Referring more particularly to the drawings, 1 is a crank shaft having a crank pin 2 offset therefrom by webs or arms 3 which extend beyond the axis of the crank shaft 1 in a direction opposite the crank pin 2 for the purpose of affording counterweight elements 4 effecting proper balance of the crank shaft assembly during rotation thereof.

As will be noted by referring to Figs. 3 and 4 of the drawings, the crank shaft comprises separable sections A and B respectively, the line of jointure thereof being at one end of the crank pin 2. A circular boss 5 is formed on the outer end face of the crank pin 2 and centrally disposed concentrically with respect thereto. A circular boss 6 of substantially smaller diameter, projects outwardly from the outer face of the circular boss 5 and is eccentrically positioned with respect to the latter. The complementary section B of the crank shaft is provided with a projecting annular flange 7 which embraces the boss 5 and cooperates with the crank pin 2 to form a shoulder 8 similar to a shoulder 9 formed on the opposite end of the said crank pin 2, the purpose for which will be set forth hereinafter.

The internal diameter of the projecting annular flange 7 is substantially equal to the diameter of the circular boss 5 and the latter is arranged for insertion in the recess 9 bounded by the internal wall of the flange 7. The eccentrically positioned boss 6 is arranged to engage an aperture 10 suitably formed in the arm 4 of the crank shaft section B.

It is pointed out that the machining of the bosses 5 and 6 and the internal diameter of the projecting annular flange 7 and the aperture 10 should be carried out with sufficient accuracy to insure a substantially snug fitting of said bosses therein and thus lock the respective crank shaft sections A and B to preclude any possible relative rotation of one of said sections with respect to the other.

For the purpose of securing a firm, substantially rigid jointure of the crank shaft sections A and B, and to further insure an absolute, snug fit of these complementary sections, it is preferable to tap screw holes 11 in the face of the boss 5 and the adjacent surface of the crank shaft section B, the portion of the tap screw holes in the outer face of the arm 4 of the section B being countersunk as at 12 in the manner disclosed in Fig. 6 of the drawing. Bolts or other threaded members 13 may then be threaded into the apertures 11 and the complementary sections A and B of the crank shaft summarily and rigidly joined together. The particular structure just described is best shown in Fig. 6 of the drawings, and as will be noted, for the purpose of absolutely precluding any possibility of relative rotation of one of the crank shaft sections with the other, a screw hole 14 is tapped respectively in the aperture 10 in the arm 4 of the section B and in the side wall surface of the eccentrically positioned boss 6, and a screw 15 is threaded thereinto and binds between the said arm 4 and boss 6.

As will be noted, by referring particularly to Figs. 1 and 5 in the drawings, the connecting rod crank pin hub 16 is in the form of a solid ring or sleeve and the internal diameter of said sleeve or hub 16 is as will be noted, substantially greater than the diameter of the crank pin 2 so that ball bearings comprising inner and outer rings 17 and 18 respectively may be positioned about the crank pin 2 between the said pin and the connecting rod hub sleeve 16. The inner bearing rings 17 are firmly secured upon the crank pin 2 and remain stationary with respect thereto. The outer surface of the bearing rings 18 contact with the internal surface of the connecting rod hub sleeve 16 and are arranged to rotate therewith on the ball bearings 19 about the fixed bearing ring 17 and the crank pin 2.

The annular surface of the hub sleeve 16 at the inner end thereof, intended to abut the arm 4 of the shaft section A, is provided with a channel 20 in which is positioned a pack ring or seal 21 constituting an oil seal effected by contact of the packing ring 21 with the surface of the shoulder 9 on the crank pin 2.

The inner surface of the connecting rod hub 16 adjacent the opposite end face thereof is threaded internally as at 22 to receive a retaining ring 23 having threads on the external surface thereof for engagement with the threads 22 in the connecting rod hub 16. The periphery of the threaded retaining ring 23 is provided with a plurality of inwardly inclined slots 24 spaced at equal intervals circumferentially with respect to said ring. A substantially T-shaped slot 25 is formed in the outer surface of the connecting rod hub 16 and is positioned therein so as to lie above the inwardly inclined slots 24 in the threaded retaining ring 23. The slot 25 is arranged to receive a pin 26 of such configuration that a portion thereof will extend below the slot 25 and engage a predetermined one of the inwardly inclined slots 24 in the retaining ring 23. A plate 27 is arranged to overlie the slot 25 in the connecting rod hub 16 and this plate 27 is pivotally connected to the outer surface of said hub so that the plate may be pivoted to one side or away from its overlying relation with respect to the slot 25 to permit access to the pin 26 residing therein.

A ring 28 having an inner diameter substantially equal to the outside diameter of the annular flange 7 serves as a closure for the end of the hub and bearing structure adjacent the crank shaft section B. The inner periphery of the ring 28 is channeled as at 28a to receive packing 29, affording an oil seal between the hub and bearing structure and the outer periphery of the annular flange 7 forming the shoulder 8 at that end of the crank pin 2.

In assembling the crank shaft connecting rod mechanism described and with the crank shaft sections A and B respectively separated as shown in Figs. 3 and 4 of the drawings, the connecting rod hub 16 is placed upon the crank pin 2 of the section B in the relation shown in Fig. 1 of the drawing with the packing seal 21 embracing the peripheral surface of the crank pin shoulder 9. The ball bearings comprising inner and outer rings 17 and 18 respectively, are mounted upon the crank pin 2 between said crank pin and the rod hub 16 and occupy substantially the entire pin surface between the pin shoulders 8 and 9 as shown, the said bearing rings being respectively separated by means of a washer or similar member 30. The previously described retaining ring 23 is then threaded internally of the connecting rod hub 16. The inner face of the ring 23 is arranged to abut the annular adjacent surface of the hithermost outer bearing ring 18 as shown in Fig. 1 of the drawings, the said ring 23 functioning to abut against said bearing assembly and eliminate any looseness or free play between the relatively movable parts of the assembly.

When the ring 23 exerts sufficient force laterally on the bearing assembly so as to firmly position the bearing ring, the ring is then locked in substantially that position by means of the pin 26 which is positioned in the T-shaped slot 25 to engage the inwardly inclined slots 24 in the retaining ring 23, the said slots 24 being provided in sufficient number as to not materially change the degree of force exerted by the retaining ring against the bearing when said ring may be turned a small distance clockwise or counter-clockwise in order to position one of the slots 24 in alignment with the corresponding arm of the T-shaped slot 25 to permit entrance of the pin 26 into the slots 24 in the retaining ring 23.

The packing ring 28 is then placed upon the peripheral surface of the flange 7 constituting the shoulder 8 of the crank shaft section A and the respective sections A and B of said shaft are joined together by placing the bosses 5 and 6 into engagement with the aperture 10 and the space residing internally of the annular flange 7 in the manner disclosed in Figs. 1 and 6 of the drawings. The bolts 13 and 15 are threaded into the taps 11 and 14 formed respectively in the arm 4 of the section A and the adjacent face of the crank pin boss 5, the said screws functioning to rigidly secure, or rather firmly join the two crank shaft sections A and B in a rigid strong joint, the construction of which precludes any possibility of relative rotation between either of the crank shaft sections A or B.

If, after considerable usage of the crank shaft and connecting rod mounted thereon, a certain amount of play exists in the connecting rod and bearing mounting on the crank pin 2, such play may be taken up and eliminated by withdrawing the pin 26 from the particular upwardly inclined slot 24 and the T-shaped slot 25 and the retaining ring 23 threaded still further inwardly of the crank connecting rod hub 16, the said pin 23 being reinserted in the T-shaped slot 25 and the particular upwardly inclined slot 24 of the ring when said ring has been advanced inwardly of the hub 16 a sufficient distance to eliminate any looseness or free play existing in the connecting rod and bearing mounted upon the crank shaft 2.

It is pointed out that while the particular disclosure in this treatise has embodied a crank shaft having but one crank arm and pin, it is within the province of this invention to provide a sectional crank shaft comprising innumerable sections and crank arms of the general character disclosed. It is further intended that the novel construction for mounting the connecting rod upon the crank pin may be equally well adapted to mounting the other end of the connecting rod to its piston or any other member that it may be desired to actuate by a crank shaft and rod arrangement.

It is further pointed out that certain installations of the ball bearing mounting of a connecting rod on the crank pin of a crank shaft and a similar mounting of the wrist pin end of the connecting rod as set forth in the preceding paragraph, it may be desirable, in order to facilitate the handling and operation of the machine, that the connecting rod be made in two or more sections which may be joined together in any suitable manner such as by bolts, pins or other similar means.

While the particular detail construction of the present invention has been set forth for the purpose of description, it is not intended that the invention be limited thereto except such as is without the scope of the annexed claims.

What is claimed is:

1. In an anti-friction bearing assembly, the combination of a crank shaft having a crank section and pin, a bearing mounted on said pin, said bearing including inner and outer one-piece rings interposed by ball bearings, a connecting rod hub embracing the bearings and being provided with a channeled retaining flange at one end thereof, a retaining ring threaded internally at the other end and arranged to abut the annular face of the one-piece outer bearing ring of the adjacent bearing, the periphery of the said retaining ring being provided with a plurality of spaced slots therein, a pin extending inwardly from the hub and engaging one of said slots in said retaining ring for securing the latter in predetermined position with respect to said hub, said pin being removable from said slots to permit adjustment of the retaining ring both inwardly and outwardly with respect to the bearings to permit play occurring in the assembly to be eliminated, and a closure ring overlying the annular face of the retaining ring.

2. In an anti-friction bearing assembly, the combination of a sectional crank shaft, one of said sections having a crank section and pin, a bearing mounted on said pin, said bearing including inner and outer one-piece rings interposed by ball bearings, a one piece connecting rod hub embracing the bearings and being provided with a channeled retaining flange at one end thereof, a retaining ring threaded internally at the other end and arranged to abut the annular face of the one-piece outer bearing ring of the adjacent bearing, the periphery of the said retaining ring being provided with a plurality of spaced inclined slots therein, a pin extending inwardly from the hub and engaging one of said slots in said retaining ring for securing the latter in predetermined position with respect to said hub, said pin being removable from said slots to permit adjustment of the retaining ring both inwardly and outwardly with respect to the bearings to permit play occurring in the assembly to be eliminated, and a closure ring overlying the annular face of the retaining ring.

3. In an anti-friction bearing assembly, the combination of a crank shaft having a crank section and pin, and anti-friction bearing mounted on said pin, said bearing including inner and outer one-piece rings interposed by ball bearings, a connecting rod hub embracing the bearing and provided with a channeled retaining flange at one end, means in the channel of said flange contacting with said crank pin shaft constituting a seal preventing leakage of oil outwardly from said bearing, a retaining ring threaded internally of the other end thereof and arranged to abut the annular face of the one-piece outer bearing ring of the adjacent bearing, the periphery of the said retaining ring being provided with a plurality of spaced inclined slots therein, a pin extending inwardly from the hub and engaging one of said slots in said retaining ring for securing the latter in predetermined position with respect to said hub, said pin being removable from said slots to permit adjustment of the retaining ring both inwardly and outwardly with respect to the bearings to permit play occurring in the assembly to be eliminated, and a closure ring overlying the annular face of the retaining ring.

4. In an anti-friction bearing assembly the combination of a sectional crank shaft having a crank section and pin, said crank shaft being removably joined together at the juncture of one crank section and said pin, a shoulder formed adjacent each end of the crank pin, a connecting rod hub surrounding the crank pin and provided with a channeled retaining flange at one end, means in the channel of said flange contacting with one crank pin shoulder to form a seal preventing leakage of oil outwardly of the assembly, an anti-friction bearing mounted on the crank pin and interposed between said pin and the connecting rod hub, said bearing including inner and outer one-piece rings separated by ball bearings, a retaining ring threaded internally of the other end of the hub and arranged to abut the annular face of the one piece outer bearing ring of the adjacent bearing, the periphery of said retaining ring being provided with a plurality of spaced inclined slots therein, a pin extending inwardly from the hub and engaging one of said slots in said retaining ring for securing the latter in predetermined position with respect to said hub, said pin being removable from said slots to permit adjustment of the retaining ring both inwardly and outwardly with respect to the bearings to permit play occurring in the assembly to be eliminated, and a closure ring overlying the annular face of the retaining ring.

5. In an anti-friction bearing assembly, the combination of a sectional crank shaft having a crank section and pin, said sections being joined together at the juncture of one crank section and the pin and rigidly maintained in assembled relation by means of bolts, a shoulder formed adjacent each end of the crank pin, a connecting rod hub surrounding the crank pin and provided with a channeled retaining flange at one end, means in the channel of said flange contacting with one crank pin shoulder to form a seal preventing leakage of oil outwardly of the assembly, an anti-friction bearing mounted on the crank pin and interposed between said pin and the connecting rod hub, said bearing including inner and outer one-piece rings separated by ball bearings, a retaining ring threaded internally of the other end thereof and arranged to abut the annular face of the one-piece outer bearing ring of the adjacent bearing, the periphery of the said retaining ring being provided with a plurality of spaced inclined slots therein, a pin extending inwardly from the hub and engaging one of said slots in said retaining ring for securing the latter in predetermined position with respect to said hub, said pin being removable from said slots to permit adjustment of the retaining ring both inwardly and outwardly with respect to the bearings to permit play occurring in the assembly to be eliminated, and a closure ring overlying the annular face of the retaining ring.

6. In an anti-friction bearing assembly, the combination of a sectional crank shaft, one of said sections having a crank section and pin, a bearing mounted on said pin, said bearing including inner and outer rings interposed by ball bearings, a connecting rod hub embracing the bearings, a retaining ring threaded internally at the other end and arranged to abut the annular face of the outer bearing ring of the adjacent bearing, the periphery of the said retaining ring being provided with a plurality of slots therein, a pin extending inwardly from the hub and engaging one of said slots in said retaining ring for securing the latter in predetermined position with respect to said hub, and a closure ring overlying the annular face of the retaining ring.

HENRY PERAZZOLI.